(12) United States Patent
Houck, II (10) Patent No.: US 7,100,867 B2
(45) Date of Patent: Sep. 5, 2006

(54) LIFTING FOIL

(76) Inventor: Ronald G. Houck, II, 2574 Echo Valley Dr., Beavercreek, OH (US) 45434

( * ) Notice: Subject to any disclaimer, the term of this patent is extended or adjusted under 35 U.S.C. 154(b) by 196 days.

(21) Appl. No.: 10/774,865

(22) Filed: Feb. 9, 2004

(65) Prior Publication Data

US 2005/0173592 A1 Aug. 11, 2005

(51) Int. Cl.
*B64C 39/08* (2006.01)
(52) U.S. Cl. .................. 244/34 A; 244/45 R; 244/130; 244/199.4
(58) Field of Classification Search .................. 244/36, 244/45 R, 45 A, 35 R, 35 A, 123, 34 R, 244/34 A, 130, 199
See application file for complete search history.

(56) References Cited

U.S. PATENT DOCUMENTS

| | | | | |
|---|---|---|---|---|
| 2,846,165 A | | 8/1958 | Axelson ..................... 244/90 |
| 3,625,459 A | * | 12/1971 | Brown ..................... 244/35 R |
| 3,834,654 A | | 9/1974 | Miranda ..................... 244/13 |
| 4,146,199 A | | 3/1979 | Wenzel ..................... 244/45 R |
| 4,365,773 A | | 12/1982 | Wolkovitch ............... 244/45 R |
| 4,390,150 A | | 6/1983 | Whitener ................... 244/45 R |
| 4,541,593 A | * | 9/1985 | Cabrol ..................... 244/45 R |
| 4,856,736 A | | 8/1989 | Adkins et al. ............. 244/45 R |
| 4,865,275 A | * | 9/1989 | Thompson .................. 244/219 |
| 4,899,954 A | | 2/1990 | Pruszenski, Jr. ............... 244/2 |
| D308,043 S | | 5/1990 | Butler ....................... D12/342 |
| 4,949,919 A | | 8/1990 | Wajnikonis ................. 244/35 R |
| 5,090,636 A | * | 2/1992 | Sadowski ..................... 244/16 |
| 5,102,068 A | | 4/1992 | Gratzer ..................... 244/35 R |
| 5,119,748 A | * | 6/1992 | Nishimura ............... 114/102.16 |
| 5,332,177 A | | 7/1994 | Boyle, Jr. .................. 244/34 A |
| 5,348,253 A | | 9/1994 | Gratzer ......................... 244/91 |
| 5,492,289 A | | 2/1996 | Nosenchuck et al. ....... 244/204 |
| 5,503,352 A | | 4/1996 | Eger ......................... 244/45 R |
| 5,634,613 A | | 6/1997 | McCarthy ................... 244/199 |
| 5,836,543 A | | 11/1998 | Kunkel et al. ............. 244/12.2 |
| 5,899,409 A | | 5/1999 | Frediani ....................... 244/13 |
| 6,095,457 A | | 8/2000 | Vanmoor ..................... 244/123 |
| 6,098,923 A | * | 8/2000 | Peters, Jr. .................. 244/45 R |
| 6,340,134 B1 | | 1/2002 | Meschino ................. 244/45 R |
| 6,474,604 B1 | | 11/2002 | Carlow ........................ 244/199 |
| 6,607,162 B1 | | 8/2003 | Warsop et al. ............. 244/12.6 |
| 6,626,398 B1 | | 9/2003 | Cox et al. .................. 244/45 R |
| 6,659,396 B1 | | 12/2003 | August ..................... 244/45 R |
| 2003/0201363 A1 | | 10/2003 | Carr | |

OTHER PUBLICATIONS

The Paper Airplane Book, Vantage Books/Science 86 © 1985 pp 42, 43.

* cited by examiner

*Primary Examiner*—Galen Barefoot
(74) *Attorney, Agent, or Firm*—John W. Donahue (57) ABSTRACT

A lifting foil for an aircraft, a hydrofoil or the like having a pair of courses or wings. Vortex losses due to spanwise fluid flow are substantially reduced by joining the tips of the courses with flow guides configured for jointly terminating the undesired flows. Termination is effected by providing the flow guides with crossections cambered for reducing the dynamic pressure of fluid flowing in a spanwise direction across flow guide surfaces.

17 Claims, 14 Drawing Sheets

LIFTING FOIL

BACKGROUND OF THE INVENTION

This invention relates generally to the field of fluid dynamics with emphasis on aerodynamic drag phenomena. A particular object of the invention is to reduce energy losses suffered by an aircraft in flight due to induced drag. It is known that this particular type of drag is accompanied by a shedding of vortices from the tips of the wings. It is believed that these vortices result from a spanwise flow of air from a relatively high pressure condition on the lower wing surface to a relatively low pressure condition on the upper wing surface. Similar phenomena occur around hydrofoils employed for underwater use. It might be remarked that air behaves much as a perfect fluid when acting against an airfoil at speeds below about 200 mph and at altitudes below about 100,000 ft. Within that regimen the mathematical tools employed for analysis of airfoils are substantially the same as those for hydrofoils General teachings regarding aircraft drag may be found in classical reference books such as "Foundations of Aerodynamics", Kuethe and Schetzer, © 1950 by John Wiley & Sons, Inc; "Aerodynamics of a Compressible Fluid", Liepmann and Puckett, © 1947 by John Wiley & Sons, Inc; "Airplane Performance Stability and Control", 1949 by Perkins and Hage, publisher John Wiley & Sons, Inc; and in "The Dynamics and Thermodynamics of compressible Fluid Flow", two volumes by Ascher H. Shapiro, The Ronald Press Company, New York, N.Y., 1953. Reference may also be made to a well known earlier work "Hydrodynamics", Sir Horace Lamb, 1879, Sixth Ed. by Dover Publications, New York, N.Y., 1945.

The prior art shows numerous techniques for dealing with induced drag, but none are fully satisfactory. Following are some typical examples.

Miranda, U.S. Pat. No. 3,834,654, teaches a box-wing aircraft having a fuselage which is centrally positioned and encircled by six adjoining wing sections.

Wenzel, U.S. Pat. No. 4,146,199 shows an aircraft having a lifting body fuselage surrounded by fore mounted aft swept and aft mounted forward swept wings. The patent describes means for inducing translation of tip-generated vortices.

Wajnikonis, U.S. Pat. No. 4,949,919 discloses hydrofoil families which partially suppress induced vorticity by introducing a longitudinal component of the flow directed by the lifting foil tip towards the hydrofoil base.

Gratzer, U.S. Pat. No. 5,348,253 teaches the attachment of a blended winglet to each wing tip.

Eger U.S. Pat. No. 5,503,352 relates to a box-wing aircraft having wing segment tips connected with arrow-shaped pylons.

Nosenchuck et al. U.S. Pat. No. 5,492,289 has a perturbation proximate to the tip end of the wing planform trailing edge.

McCarthy U.S. Pat. No. 5,634,613 generates beneficial wing tip vortices which are said to rotate in a direction opposite to that of induced drag vortices. The patent asserts that the beneficial vortices create upwash fields which neutralize induced drag. The reference discusses numerous other references dated earlier than 1994.

Frediani U.S. Pat. No. 5,899,409 discloses a large passenger plane having a pair of rearwardly swept wings arranged in tandem with a pair of forwardly swept wings.

Vanmoor U.S. Pat. No. 6,095,457 teaches an airfoil which is reversely curved in accordance with a trigonometric function.

Meschino U.S. Pat. No. 6,340,134 B1 shows an aircraft having a drag reduction system which includes a high aspect ratio, supplementary wing for providing at least 65% of the total lift. The main wing provides structural integrity.

Carlow U.S. Pat. No. 6,474,604 B1 teaches a mobius-like joining structure which is said to reduce vortex-induced drag on a foil.

Huenecke U.S. Pat. No. 6,513,761 B2 discloses the use of vortex generators at the trailing edge of each wing for partly dissipating the vortices responsible for induced drag, Cox et al. U.S. Pat. No. 6,626,398 B1 teaches an unmanned reconnaissance biplane having staggered and gapped wings.

While much has been accomplished by others in reducing drag losses of lifting foils, much still remains to be done. It is an undeniable fact that commercial and governmental air transportation expenditures are very high and are steadily increasing. These costs ultimately are passed on to an already overburdened public A substantial proportion of that expenditure pays for fuel which is burned in overcoming induced drag. Even small reductions in that drag may have the potential to create enormous savings for the public.

SUMMARY OF THE INVENTION

This invention provides a novel lifting foil configured generally in the form of an endless band having a plurality of exposed surfaces which meet at common boundary lines. The lifting foil comprises a generally horizontal upper course, a generally horizontal lower course parallel to and spaced apart from the upper course and a pair of opposed, vertically extending flow guides. A first one of these flow guides joins a first end of the upper course to a corresponding first end of the lower course, while a second flow guide joins a second end of the upper course to a corresponding second end of the lower course.

The joinder of the upper and lower courses to the flow guides occurs at four margins, referred to herein as an upper starboard margin, an upper port margin, a lower starboard margin and a lower port margin. The flow guides are blended into the courses at those margins so as to avoid discontinuities in the fluid flow across the inner and outer surfaces of the foil. In the use of the invention a working fluid, such as water or air, flows from fore to aft through a large central passage, where it exerts dynamic pressure outwardly against an exposed first surface of the foil. The working fluid also flows around the exterior of the foil, exerting dynamic pressure inwardly against a second surface thereof. The region between the first and second surfaces defines a cambered lifting body which reacts to the dynamic pressure on its first and second surfaces by generating a net upwardly directed lifting force. Preferably the lifting foil has a third surface for dividing the large central passage into a pair of smaller, spaced apart, passages having generally elliptical crossections and a fuselage therebeween.

The flow guides are designed to avoid generation of spanwise fluid flow by balancing the pressure at the upper starboard margin against the pressure at the lower starboard margin, and concomitantly balancing the pressure at the upper port margin against the pressure at the lower port margin. Preferably the pressure balancing is accomplished by configuring the starboard flow guides to have a cross section which will reduce a dynamic pressure from a maximum value at the upper starboard margin to a midpoint value of zero, while simultaneously increasing the dynamic pressure from a midpoint value of zero to a maximum value at the lower starboard margin. A similar process is carried out on the port side of the foil.

The lifting foil is unexpectedly stable and easily controllable in flight. It is believed that the performance of the foil is due, at least in part, to the tendency of the flow guides to stabilize the dynamic pressure at the ends of the upper and lower courses. This reduces the flow of fluid in the spanwise direction and makes the courses behave in the manner expected for 2-dimensional lifting bodies. It is believed that a lifting foil in accordance with the present invention enjoys reduced spanwise fluid flow and that this in turn eliminates, or at least substantially reduces, the generation of drag-producing vortices.

It is therefore an object of the present invention to provide an apparatus and method for improving the dynamic performance of a lifting foil.

It is another object of the invention to reduce induced drag vortices to zero.

A further object of the invention is to reclaim vortex energy while reducing tailplane aerodynamic balancing drag to zero.

A still further object of the invention is to increase lift with no substantial drag penalty.

Other objects of the invention are to increase lift and decrease drag for very low speed flight, to reduce spanwise fluid flow in a lifting foil, to decrease aircraft drag and improve aircraft stability, as well as other and further objects and advantages as will be apparent from the following description, the accompanying drawings and the appended claims.

DESCRIPTION OF THE PREFERRED EMBODIMENT

Figure 1:
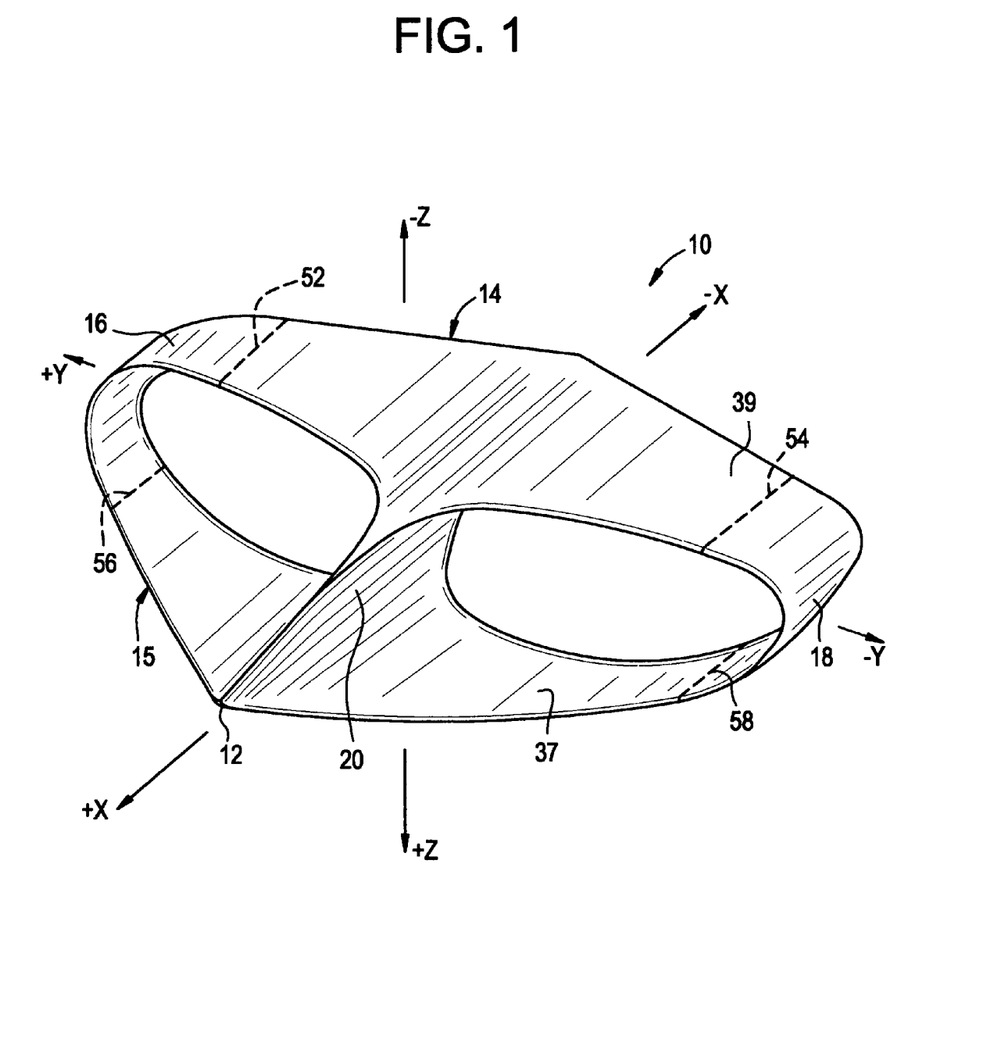
FIG. 1 is a perspective view of a lifting foil.
Figure 2:
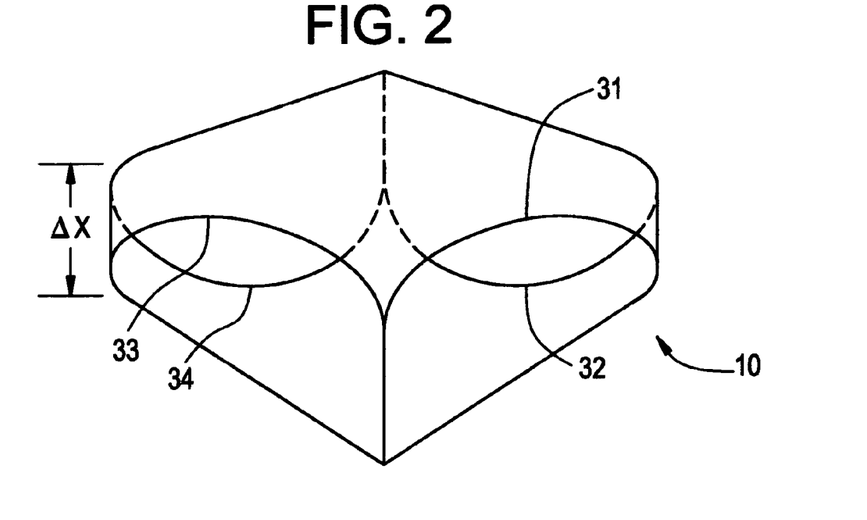
FIG. 2 is a top view of the lifting foil of FIG. 1.
Figure 3:
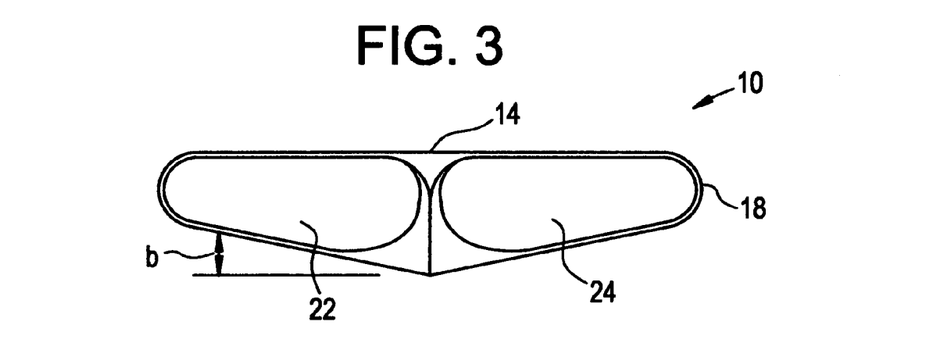
FIG. 3 is a front view of the lifting foil of FIG. 1.
Figure 4:
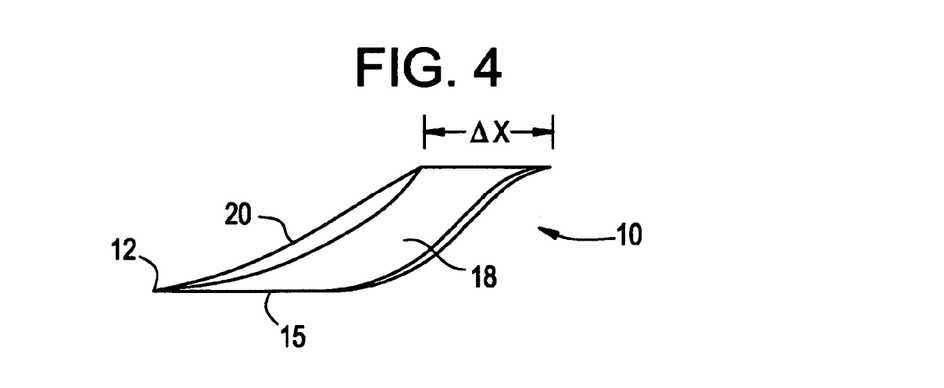
FIG. 4 is a side view of the lifting foil of FIG. 1.

A preferred embodiment of the subject invention may have a form as generally illustrated by lifting foil 10 in FIGS. 1–4. FIG. 1 is a perspective drawing of the lifting foil with a coordinate system attached. The coordinate system has its origin at the center-of-gravity of foil 10. It is right-handed and employs conventional 3-axis, X,Y,Z Cartesian coordinate designations. Directions may also be referred to as "starboard" (+Y), "port" (−Y), "fore" (+X), "aft" (−X), "up" (−Z) and "down" (+Z). The term "spanwise" is used to refer to sideward motion in either the +Y or −Y direction. The lifting foil is laterally symmetrical across the X-Z vertical plane. FIG. 2 is a top view of lifting foil 10 while FIGS. 3 and 4 are front and side views respectively.

Lifting foil 10 comprises four basic elements, blended end-to-end to form a closed loop surrounding an open interior These elements are an upper course 14, a lower course 15, a starboard flow guide, 16 and a port flow guide 18. Upper course 14 is positioned generally in an X-Y plane and has an upper starboard margin 52 and an upper port margin 54. Lower course 15 is geometrically similar to upper course 14 and is situated parallel thereto. Lower course 15 has a lower starboard margin 56 and a lower port margin 58. Margins 52, 54, 56, and 58 are best shown by phantom lines in FIG. 1 Starboard flow guide 16 is joined to upper course 14 at upper starboard margin 52 and is joined to lower course 15 at lower starboard margin 56. Port flow guide 18 is joined to upper course 14 at upper port margin 54 and is joined to lower course 15 at lower port margin 58. It should be understood that the margins 52, 54, 56 and 58 merely define the geometric limits of the four principal elements and do not have any particular structural significance. Upper course 14 and lower course 15 generate lift in the −Z direction when traveling in the +X direction through a surrounding fluid or when held stationary against a surrounding fluid moving in the −X direction. Flow guides 16, 18 are configured in the form of an arc having a center portion 69 of substantially circular curvature and end portions 68, 70 of a curvature which causes a blending with the surfaces of upper course 14 and lower course 15. (See FIG. 6).

Figure 8:
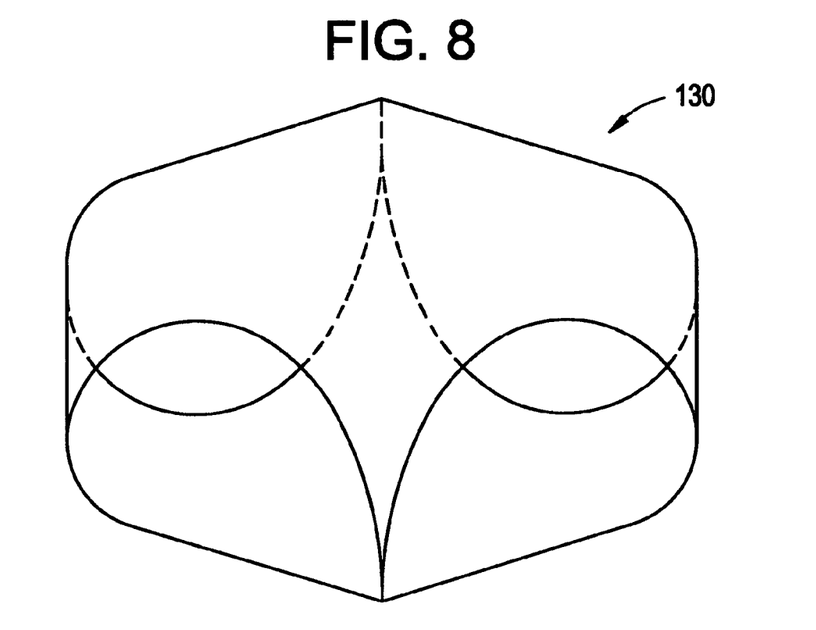
FIG. 8 is a top view of an alternative embodiment of the invention.
Figure 9:
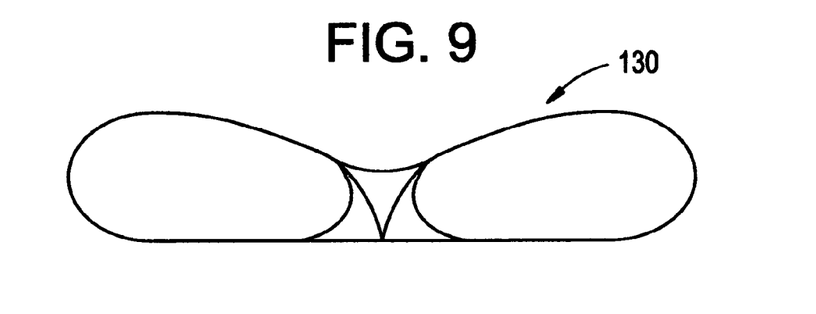
FIG. 9 is a front view of the embodiment of FIG. 8.
Figure 10:
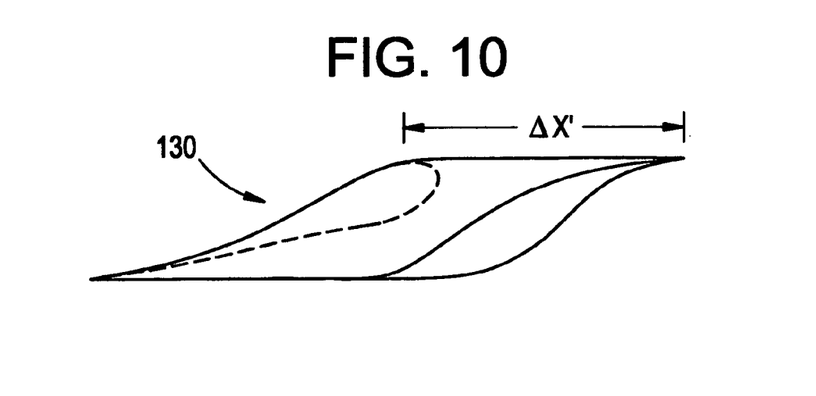
FIG. 10 is a side view of the embodiment of FIG. 8.
Figure 11:
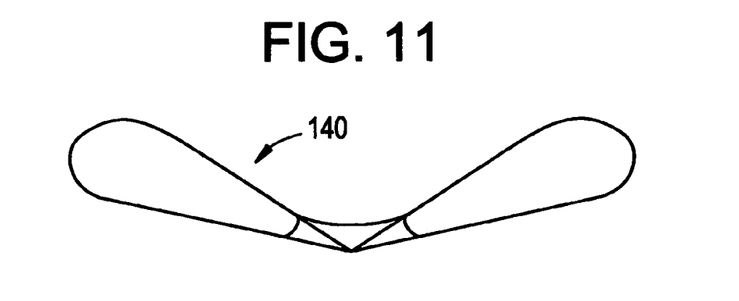
FIGS. 11–18 are front views of second through ninth alternative embodiments of the invention.
Figure 12:
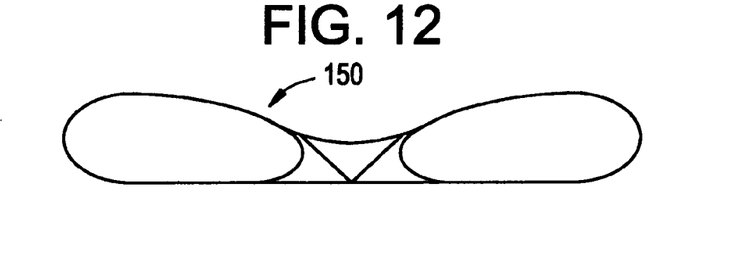
Figure 13:
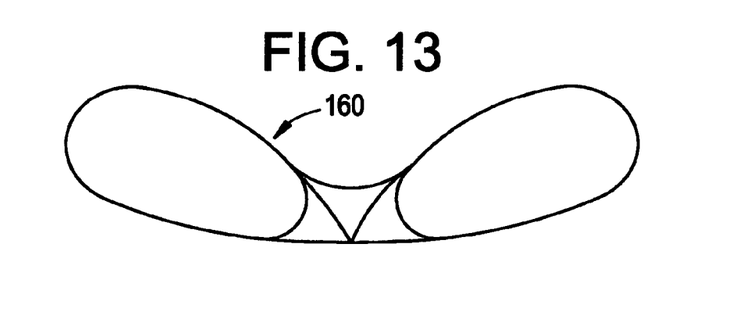
Figure 14:
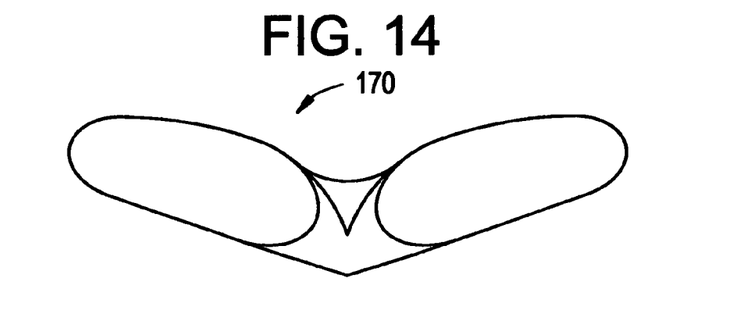
Figure 15:
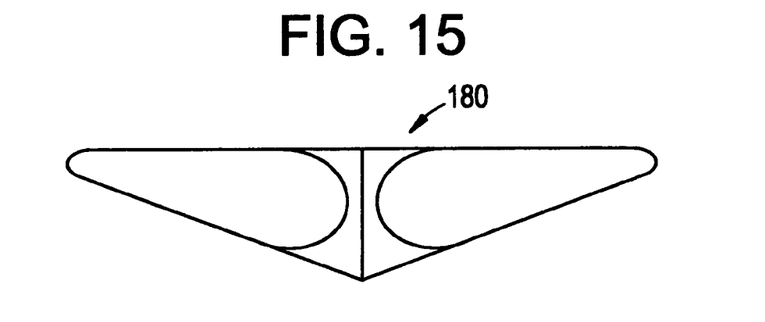
Figure 16:
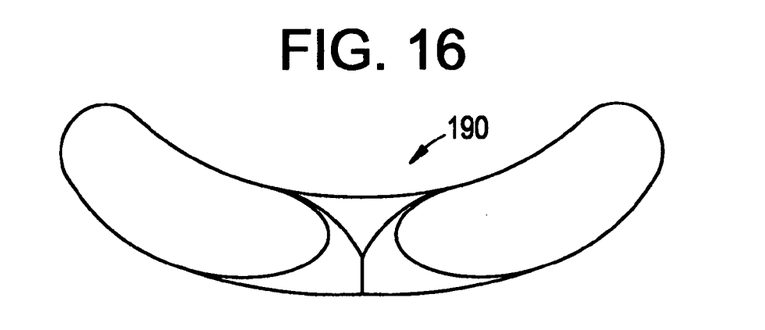
Figure 17:
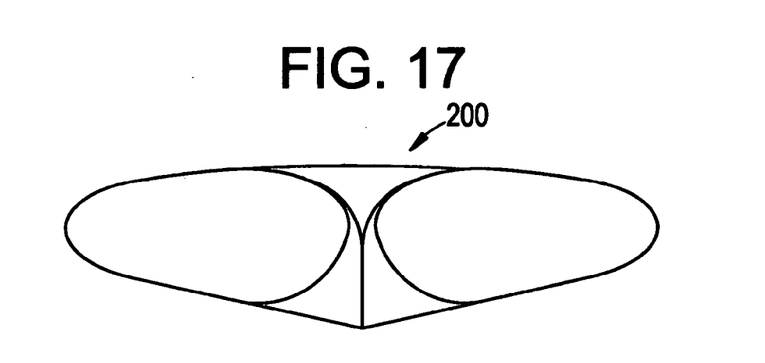
Figure 18:
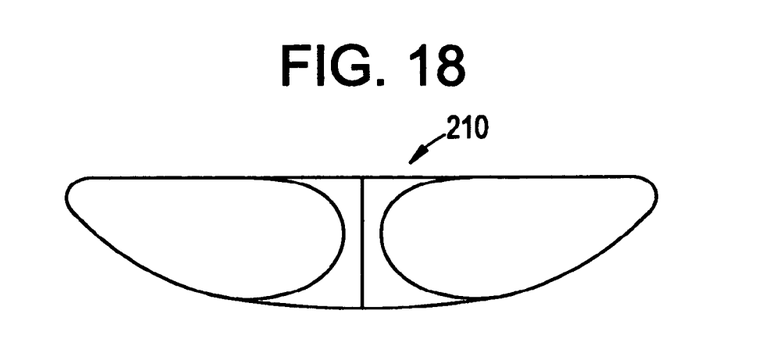

Preferably upper course 14 is rearwardly offset by a distance ΔX from lower course 15, as illustrated in FIGS. 2 and 4. This offset is a design feature which may be selected in such a way as to provide a cargo carrying capability appropriate for the intended use of the lifting foil. By way of example, FIG. 10 shows a side view of a cargo carrier 130 having a somewhat extended offset ΔX'. FIGS. 8 and 9 are a top view and a front view, respectively of cargo carrier 130.

Upper course 14 may be swept rearward, and lower course 15 may be swept forward. If lifting foil 10 happens to be an aircraft, then it may be desirable to incorporate a fuselage 20 into the structure. As illustrated in FIG. 1, fuselage 20 may be positioned midway between flow guides 16 and 18 and extend upwardly from lower course 15 to upper course 14. Fuselage 20 may house a suitable power supply, controls and one or more passenger compartments. Most conveniently a cockpit and crew quarters may be located in a nose area designated by reference numeral 12. Ample space is available for placement of aerodynamic control surfaces. The entire surface of lifting foil 10 is smooth, and its four principal elements are blended together so as to minimize vortex generation.

Lifting foil 10 has four boundary lines 31, 32, 33 and 34 as illustrated in FIG. 2. The configuration of lifting foil 10 may be established by stretching a warped surface in the area outside the four boundary lines 31–34. Three surfaces, including a first surface 37, a second surface 38 and a third surface 39 meet at these boundary lines. In its most preferred embodiment lifting foil 10 has a fuselage 20 within an interior region extending rearwardly and upwardly from reference point 12 and exteriorly bounded by first surface 37, second surface 38 and third surface 39.

Lifting foil 10 has a starboard flow passage 22 and a port flow passage 24, as best illustrated in FIG. 3. These flow passages are generally symmetrical. As fluid flows through passages 22, 24, it experiences point-to-point variations in the magnitude and direction of the velocity. These velocity variations cause variations in dynamic pressure (commonly called "q") throughout the moving fluid. According to the well known Bernoulli equation, $$q = \tfrac{1}{2}\rho V^2$$

where:
$\rho$ is the density of the fluid, and
V is the fluid velocity.

Figure 5A:
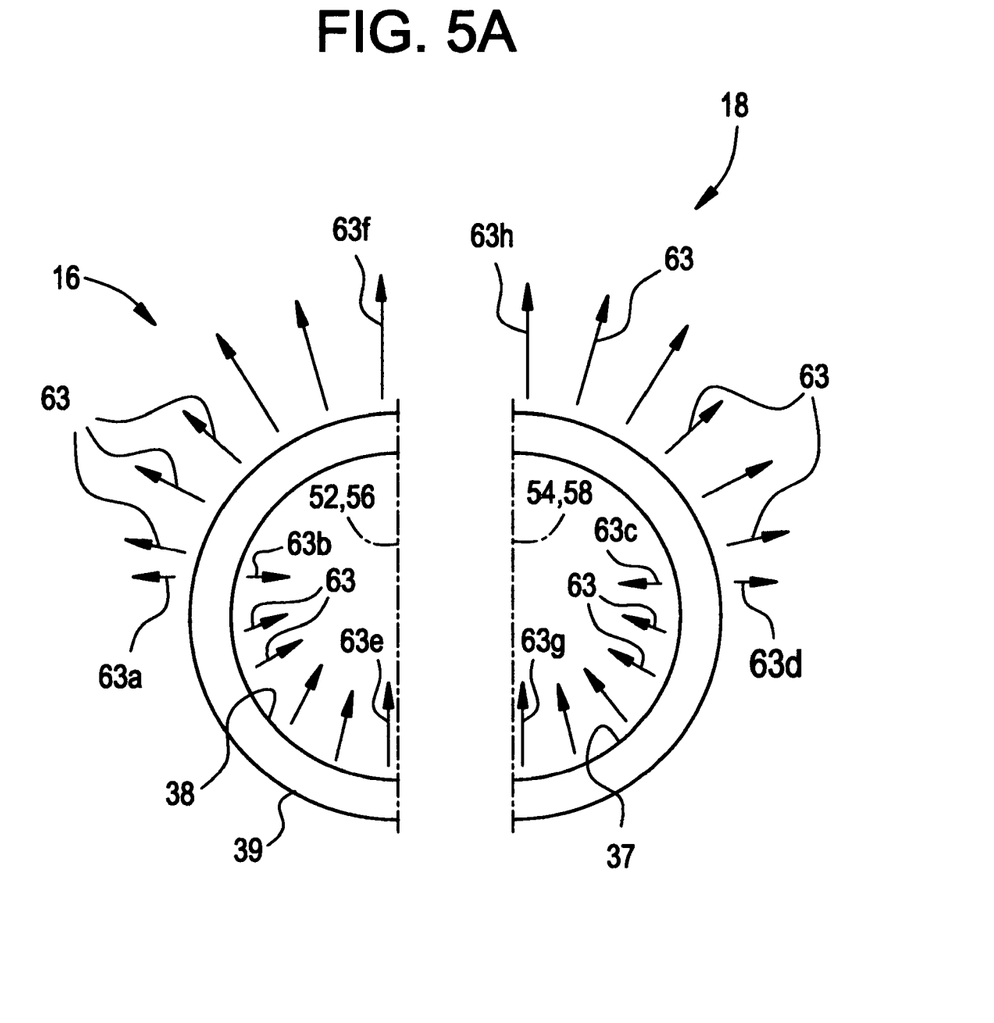
FIG. 5A is a schematic illustration of pressure forces against a pair of flow guides.

Lifting foil 10 experiences a net force having a magnitude and direction depending upon the size of its wetted area and the variations in dynamic pressure thereacross. FIG. 5A illustrates a pattern of incremental forces 63$a$–63$h$ applied against the surfaces of flow guides 16, 18 as a result of dynamic pressure variations. Incremental forces 63$a$–63$h$ are represented by vectors oriented normal to the surfaces of flow guides 16, 18 and having lengths corresponding to the magnitudes of the incremental forces being represented. For ease of illustration vectors 63$a$–63$h$ represent vector sums of incremental forces operating at the same aspect angle against second surface 38 and third surface 39. As used herein, reference numeral 63 applies generally to any of the illustrated vectors, specific ones of vectors 63 being designated 63$a$ through 63$g$. The total force exerted by the fluid against flow guide 16 is given by the expression:

$$F = \Sigma q \Delta A$$

where $\Delta A$ is an elemental area wetted by the fluid.

The vertical component of the vector F is the lift.

Still referring to FIG. 5A, attention is directed at vectors 63$a$ and 63$b$. These vectors are of equal magnitude, horizontal and oppositely directed. Vectors 63$a$ and 63$b$ are therefore self-cancelling. Other vectors 63 have vertical components in addition to any horizontal component. The horizontal components are self-cancelling, but the vertical components of these vectors are commonly directed. Therefore the vertical components are additive, and lift-contributing. Similarly port flow guide 18 is subjected to pressure forces represented by vectors 63$c$ and 63$d$ having self-cancelling horizontal components. Vectors 63$e$–63$h$ represent pressure forces at margins 52, 56 of flow guides 16, 18 and have no horizontal component.

As indicated previously, the inboard boundaries of starboard flow guide 16 are delineated by upper starboard margin 52 and lower starboard margin 56. These two margins are shown schematically in FIG. 5A by a single, vertical phantom line. Similarly, a single vertical phantom line represents upper port margin 54 and lower port margin 58, the inboard boundaries of port flow guide 18. It will be understood that upper course 14 extends between upper starboard margin 52 and upper port margin 54 and has a uniform pressure pattern shown by the length of pressure vectors 63$f$ and 63$h$. Similarly lower course 15 extends between lower starboard margin 56 and lower port margin 58 and has a uniform pressure indicated by vectors 63$e$ and 63$g$.

Starboard and port flow guides 16, 18 create blended bridges between upper course 14 and lower course 15. And while their operation is not yet fully understood, it is believed that Starboard and port flow guides 16, 18 connect courses 14, 15 together in such a way as to cause each to function as a terminator for the other. It appears that they provide equalizing fluid flows which balance out spanwise pressure variations, thereby making courses 14, 15 behave like virtual two-dimensional wings. However, regardless of the precise process taking place within starboard and port flow guides 16, 18, the lifting foil of this invention inherently obtains remarkable results, as hereinafter described.

Figure 5B:
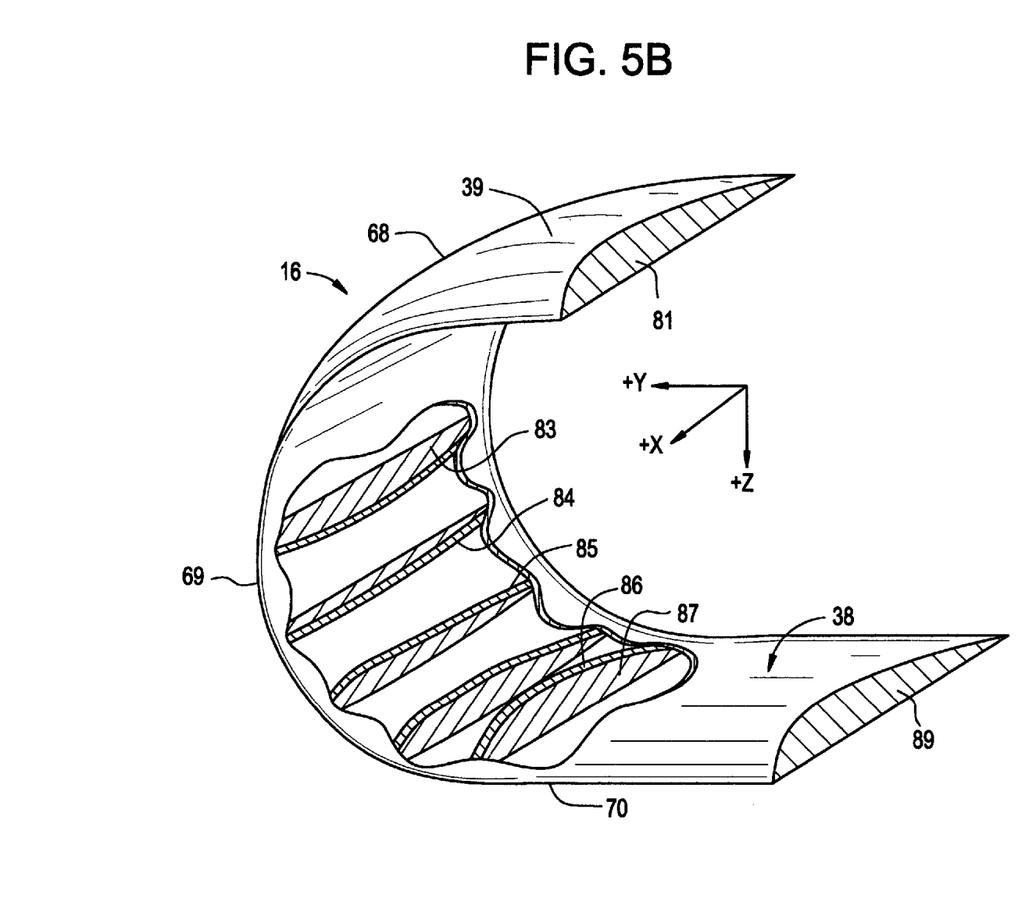
FIG. 5B is a partially cut away perspective drawing of a flow guide.

FIG. 5B illustrates one possible structure for a starboard flow guide 16. The structure of a port flow guide 18 would be identical, except for left and right hand parts differences. Referring now to FIG. 5B, flow guide 16 is seen to comprise a series of stiffening ribs secured between second surface 38 and third surface 39. For additional stiffness, the illustrated ribs may be tied together by one or more spars (not illustrated). Surfaces 38 and 39 have been introduced above and serve as covering for a large area of lifting foil 10. By way of example, surfaces 38 and 39 may be fabricated from thin aluminum sheet material.

FIG. 5B illustrates flow guide 16 with second surface 38 partially cut away to reveal five typical ribs 83–87. Two end ribs 81 and 89 are also exposed. These latter two ribs are welded or otherwise secured to structure (not illustrated) at margins 52, 56. This creates blended connections between starboard flow guide 16 and adjoining ends of courses 14, 15. Two more ribs 82 and 88 are not illustrated in FIG. 5B but will be discussed below in connection with the description of FIGS. 6B and 6H. Port flow guide 18 is similarly joined to courses 14, 15 at margins 54, 58 respectively.

Figure 5C:
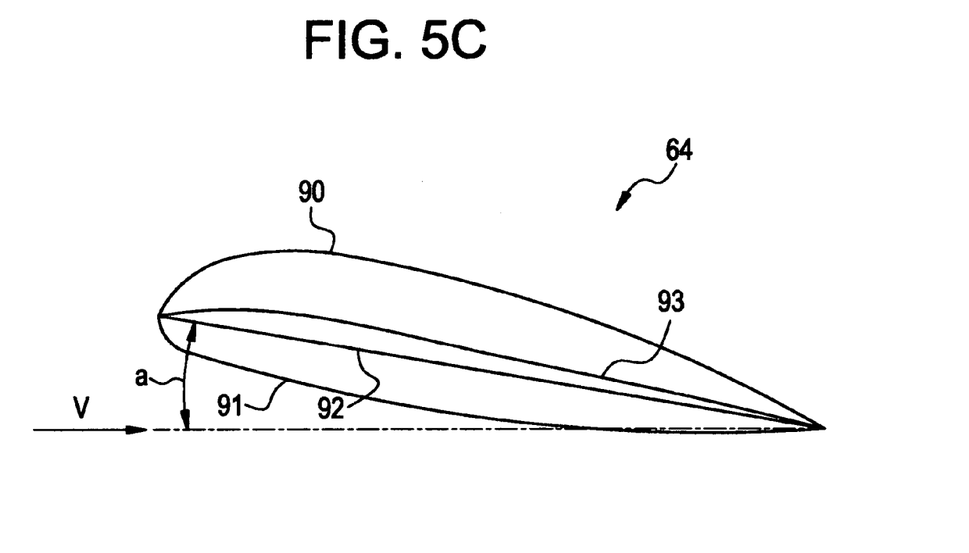
FIG. 5C is a diagram of a cambered airfoil.

FIG. 5C serves as an aid in understanding the geometry involved in the achievement of coordinated lift at both upper and lower ends of flow guide 16. Shown there is a side view of a rib, being generic in nature and labeled for identification with reference numeral 64. Rib 64 has an upper surface 90, a lower surface 91, a chord line 92 and a mean camber line 93. The chord line runs between the ends of the rib, while the mean camber line follows a locus of positions midway between upper surface 90 and lower surface 91. The area between chord line 92 and mean camber line 93 represents the lift available from a surface wrapped around the rib. That lift may be increased by changing the curvature of surfaces 90 and/or 91 to increase or decrease the area between chord line 92 and mean camber line 93. The lift may also be changed by modifying the angle of attack, "a", the angle between chord line 92 and the relative fluid velocity "V".

Figure 6:
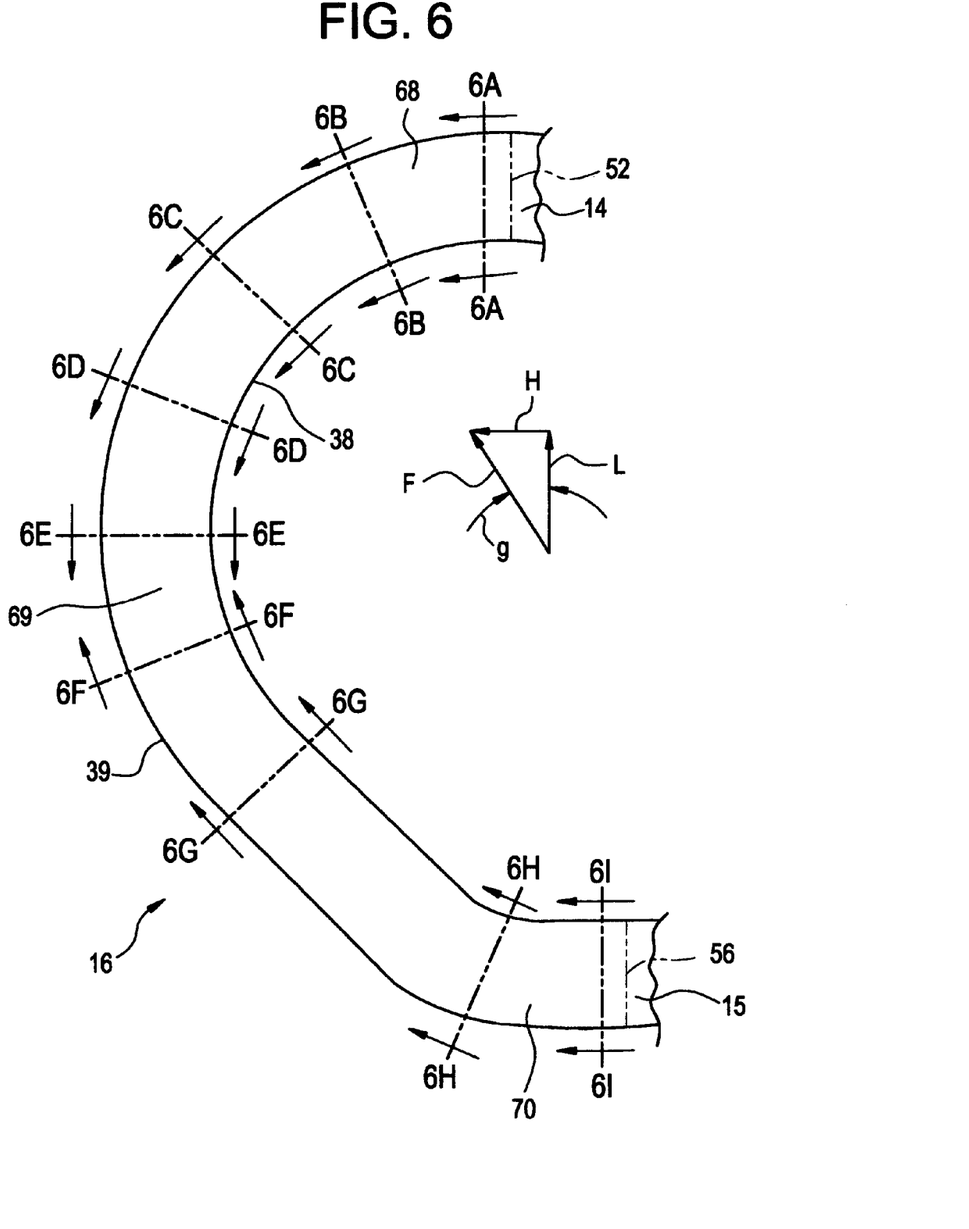
FIG. 6 is a schematic side view of a lifting foil according to the invention.
Figure 6A:
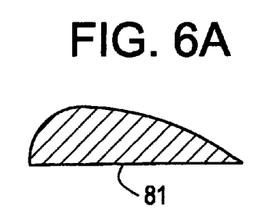
FIGS. 6A–6I are cross sections of ribs located at angularly displaced positions on FIG. 6.
Figure 6B:
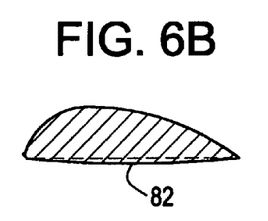
Figure 6C:
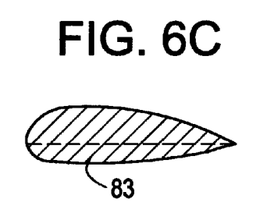
Figure 6D:
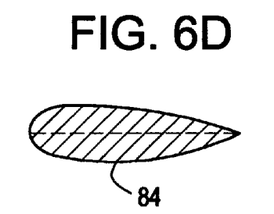
Figure 6E:
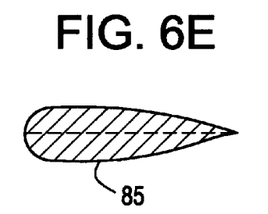
Figure 6F:
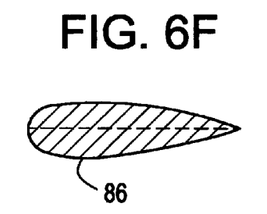
Figure 6G:
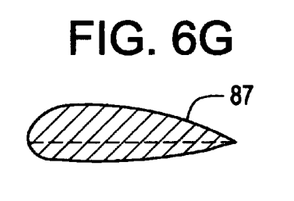
Figure 6H:
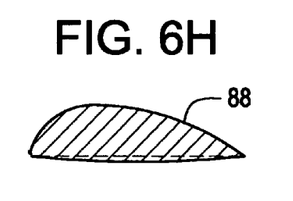
Figure 6I:
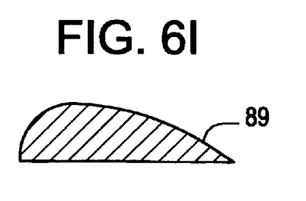

The operation of flow guide 16 is explained diagrammatically in FIG. 6. That figure has nine placement lines, 6A—6A through 6I—6I, indicating the locations and viewing directions for nine cuts across flow guide 16. Sketches of those nine cuts are appear on FIGS. 6A–6I, as indicated by reference numerals 81–89.

It is desired to produce substantially uniform lift along the lengths of courses 14, 15 between their respective margin pairs. It is also desired to have that lift drop substantially to zero at the course margins. Those desires substantially are met by placing flow guides 16, 18 between courses 14, 15, at margins 52, 54, 56 and 58 as described above. The flow guides have cambered crossections which provide lift ranging from a maximum value down to a minimum value, preferably zero, and then increasing from the minimum value back to the maximum. The maximum value for the lift is the same as the value of the lift at margins 52, 54, 56 and 58 of courses 14, 15. For present purposes it should be understood that the term "lift" is being used loosely as a shorthand for "lift per unit span".

FIG. 6 assumes that lifting foil 10 is moving in the +X direction, thereby creating an apparent fluid motion in the −X or aft direction and producing lift in the −Z direction. Also appearing on the figure is a vector diagram 175. Shown there are the above-described net force vector, F, a lift vector, L and a horizontal vector, H. V and L meet at an angle, "g". H is perpendicular to L, so the three vectors define a right triangle. L is always vertical and is the vertical component of F. F may be positioned such that g may have any value between 0 and II radians. The camber of the crossections illustrated in FIGS. 6A–6E may be made proportional to COS(g), so that the lift generated by the first II/2 rad. goes from max to 0. However, the camber of the crossections illustrated in FIGS. 6E–6I should be made proportional to COS(II−g), so that the lift over that angular range goes from 0 to max. This matches the terminating pressure conditions at margins 52, 56. In a similar manner the pressure conditions at margins 54, 58 are matched by flow guide 18. In this manner I am able to avoid a negatively directed lift by either of courses 14, 15 This invention provides flow guides in matching pairs such that each member views a termination of the other as a continuation of itself, thereby reducing pressure imbalances in the spanwise direction.

Referring now to FIGS. 6A–6I there are shown, by way of example, nine rib crossections 81–89. Ribs 81, 89 are substantially identical and are cambered to provide the above described maximum lift. Rib 85 (FIG. 6E) is perfectly symmetrical about a horizontal plane and generates no lift. Ribs 82–84 ramp the lift from the maximum down to zero, while ribs 86–88 ramp the lift from zero back to the maximum.

It will be observed that the underside of lifting foil 10 is keel-shaped, extending symmetrically upward at an angle "b" on both sides of a baseline extending in the X-direction through reference point 12. This provides a small dihedral for minimizing adverse effects of sideslip. For an embodiments as illustrated in FIG. 3, a suitable dihedral angle may be about 5 degrees, applied symmetrically to passages 22, 24. One of ordinary skill in the art may easily determine an appropriate dihedral angle for other embodiments of the invention. See Chapter 9 of Perkins and Hage, Sixth Printing, February, 1957.

Figure 7:
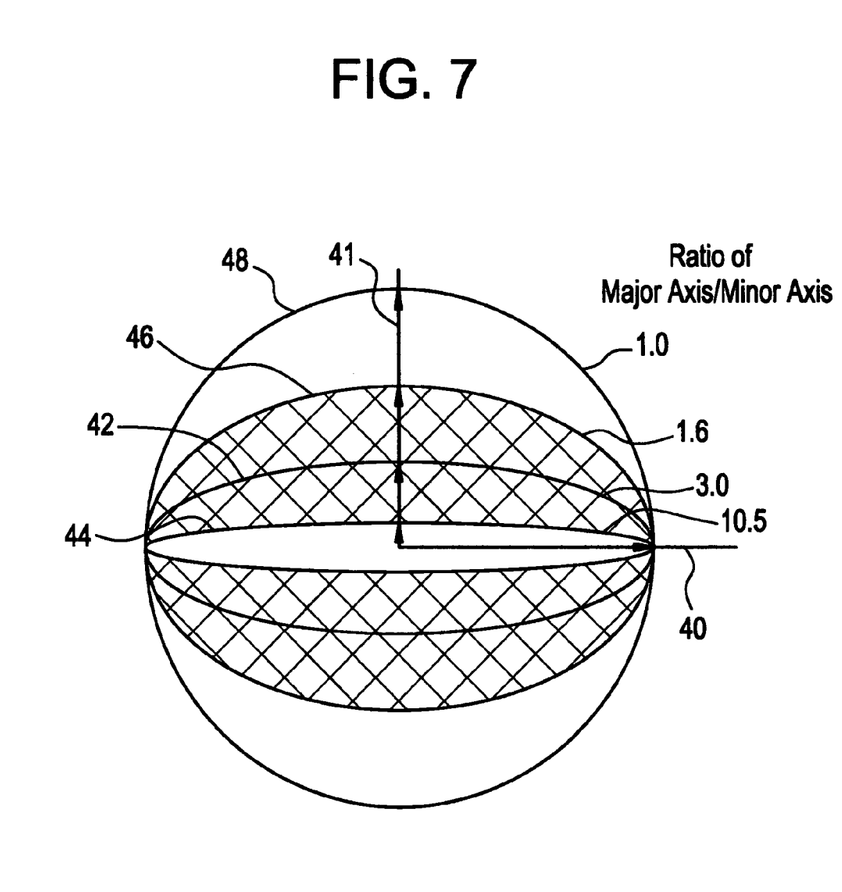
FIG. 7 illustrates a range of elliptical crossections having major axis/minor axis ratios which are deemed useful for configuring a lifting foil.

Cross sections of lifting foil 10 which are taken across the Y-Z plane have a generally elliptical appearance, as illustrated in FIG. 7. The elliptical shape seems to play a beneficial role in the performance of the lifting foil. However, it is not known how much of the benefit is attributable to the elliptical shape and how much is due to other factors, such as flow guides 16, 18.

There are a number of ways of specifying the ellipticity of a closed line. For present purposes it is convenient to use the major-axis/minor-axis ratio. Referring now to FIG. 7, there is shown a family of ellipses having a common major axis 40. The family members have minor axes falling at various positions along line 41. Four such ellipses 42, 44, 46, 48 have ratios of 3.0, 10.5, 1.6 and 1.0, respectively. Ellipse 48 is a special case where the ellipse becomes a circle. That is not of interest herein. Also not of interest is a case where the ratio goes to infinity, and the ellipse collapses against the major axis. The three remaining cases are of interest in the practice of this invention.

It has been found that the lifting foil performs best when the major-axis/minor-axis ratio is around 3.0. Maximum and minimum values are about 10.5 and 1.6 respectively. The region occupied by ellipses within that range is crosshatched in FIG. 7. I am able to identify that region as a result of information acquired during a flight test program involving many flight tests of scale model lifting foils, variously configured in accordance with this invention. Those models exhibited remarkable stability for both powered and unpowered flight, and were found to be amazingly easy to control.

FIGS. 8–10 are top, front and side views respectively of a first alternative embodiment of the invention, a cargo-carrying "stretch" version. This version is identical to the version of FIGS. 2–4, except for the offset distance which has been increased from $\Delta X$ to $\Delta X'$.

Figure 20:
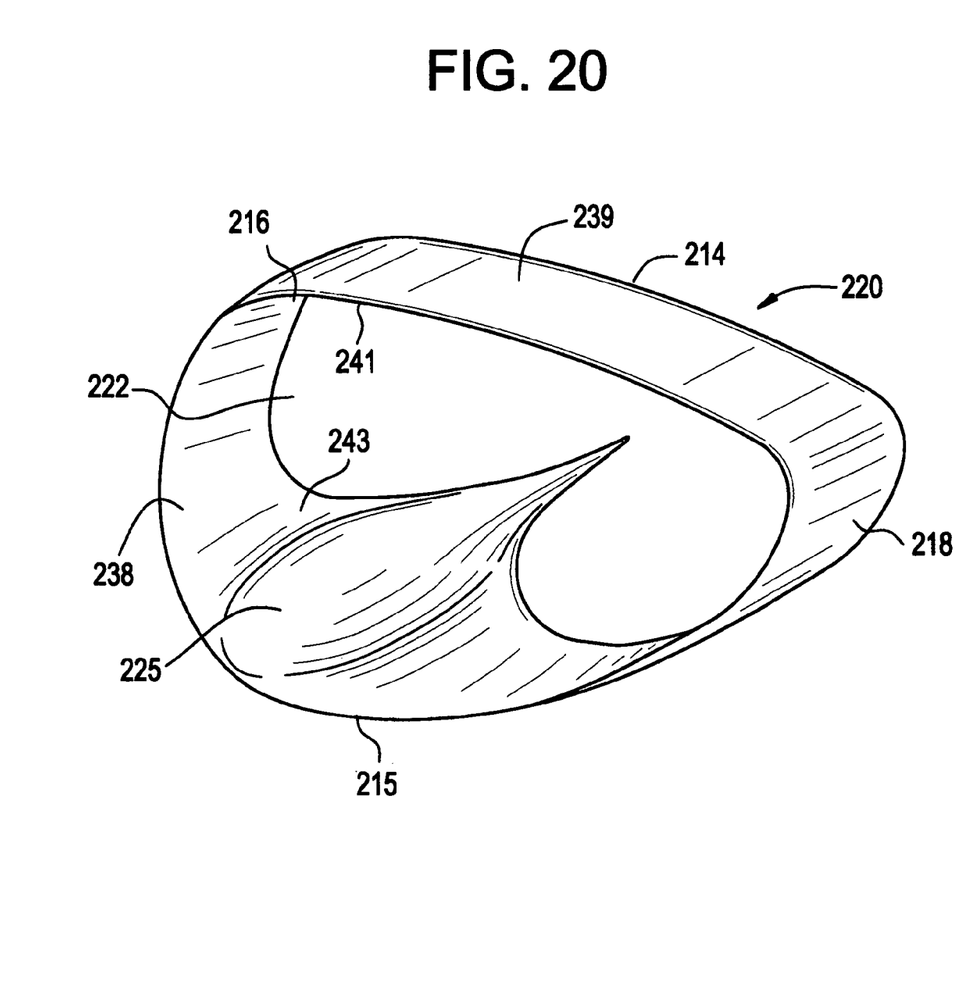
FIG. 20 is a perspective view of a tenth alternative embodiment of the invention.
Figure 21:
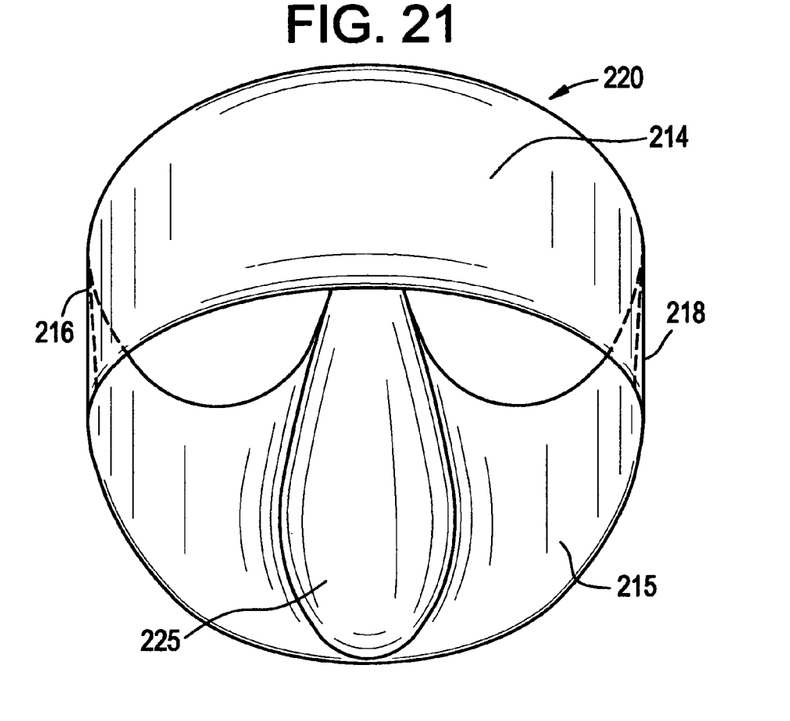
FIG. 21 is a top view of the embodiment of FIG. 20.
Figure 22:
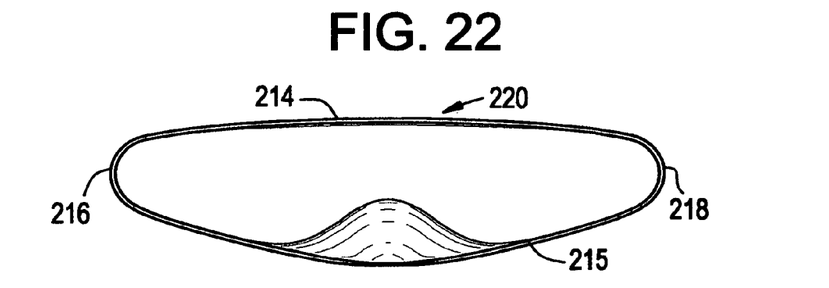
FIG. 22 is a front view of the embodiment of FIG. 20.
Figure 23:
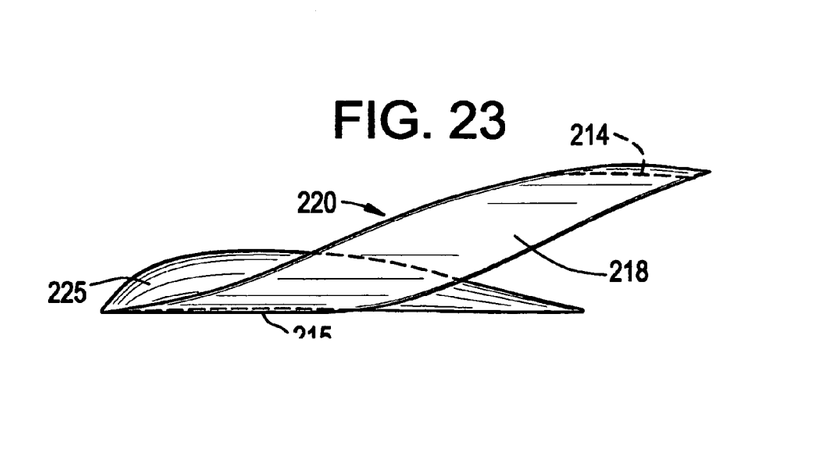
FIG. 23 is a side view of the embodiment of FIG. 20.

FIGS. 11–18 are front views, respectively, of second through ninth alternative embodiments 0, 170, 180, 190, 200 and 210 of the invention. A tenth alternative embodiment of the invention 220 is shown in perspective in FIG. 20, top, front and side views, respectively, being shown in FIG. 21. Lifting foil 220 is similar to lifting foil 10, except for the substitution of a facilities bay 225 for fuselage 20. The functions of fuselage 20 are all handled inside facilities bay 225. This eliminates some supporting structure, but it likewise reduces weight and drag. The courses and flow guides of this tenth alternative embodiment operate in like manner as their counterparts in the version of FIG. 1. Note that lifting foil 220 has only one passage 222, two boundary lines 241, 243 and two exposed surfaces 238, 239.

Figure 19:
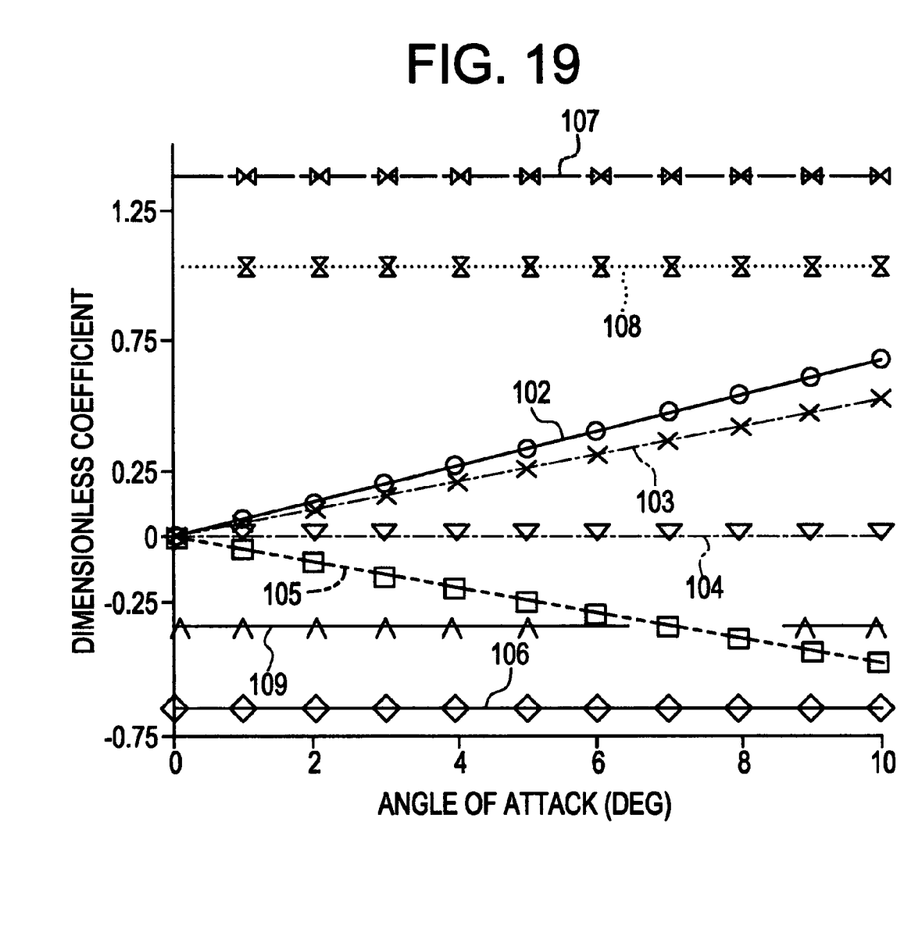
FIG. 19 is a graphical plot of calculated performance characteristics for the lifting foil of this invention and comparative calculated characteristics for a typical prior art lifting foil.

Key performance parameters for an hypothetical lifting foil according to my invention have been calculated with the aid of a digital computer. The computer ran a simplified program. Employing a well known procedure which models a cambered lifting foil as a series of panels, or Flat plates at varying angles of attack The same program was run for a typical prior art standard Wing of the same span and area. The resulting data are plotted in FIG. 19 as a series of curves identified by reference numerals as follows:

102 Lift Coefficient (This Invention)
103 Lift Coefficient (Standard Wing)
104 Drag Coefficient (Same for both)
105 Moment Coefficient (This Invention)
106 Stability Coefficient (This Invention)
107 Span Efficiency (This Invention)
108 Span Efficiency (Standard Wing)

Referring now to FIG. 19, the computer calculations indicate that the lifting foil of this invention is a substantial improvement over the standard wing. In particular, there is an improvement of about 35% in span efficiency, an improvement of about 30% in lift coefficient and an improvement of about 25% in moment coefficient. While not plotted in FIG. 19, the standard wing stability coefficient, $d(C_M)/d(C_L)$ went from −0.350711 to −0.345073 or a value of about −0.35 throughout the angle of attack range from 0 to 10 deg. That compares with a value of about −0.64 for my lifting foil, thereby indicating that I have achieved a stability margin improvement of about 5% The lifting foil of this invention is expected to achieve such results with no significant increase in drag.

It will be appreciated that this invention has application to a number of significantly different situations where fluid drag is encountered; for example to fixed wing aircraft, rotary wing aircraft, submarines and hydrofoils. Those skilled in the art will understand that many modifications may be made to structures, materials, proportions, arrangements, components and methods described herein, without departing from the scope of the invention claimed below.

What is claimed is:

1. In a lifting foil the combination of
(a) A lower course having a lower starboard margin and a lower port margin, said lower course extending sideward between said lower starboard margin and said lower port margin and being responsive to fluid flow in a direction −X, for generating a first fluid reaction force having a first lifting component in a direction −Z.

(b) An upper course having an upper starboard margin and an upper port margin, said upper course being positioned above said lower course and extending sideward between said upper starboard margin and said upper port margin for generating a second fluid reaction force having a second lifting component in said direction, −Z, parallel and additive to said first reaction force.

(c) A starboard flow guide extending vertically between said lower starboard margin and said upper starboard margin, having a progressively adjusted camber for suppressing spanwise fluid flow in a direction +Y, perpendicular to −X and −Z, and (d) A port flow guide extending vertically between said lower port margin and said upper port margin, having a progressively adjusted camber for suppressing spanwise fluid flow in a direction −Y, opposite to +Y.

2. A lifting foil according to claim 1, wherein said flow guides are secured to said courses by smooth, continuous connections which blend into said courses at said margins.

3. A lifting foil according to claim 2 further comprising, means defining a plurality of boundary lines and a plurality of surfaces bounded by said plurality of boundary lines.

4. A lifting foil according to claim 3 wherein said plurality of boundary lines are 4 in number.

5. A lifting foil according to claim 4 wherein said plurality of surfaces are 3 in number.

6. A lifting foil according to claim 5 wherein said lifting foil has a vertical crossection which is generally elliptical.

7. A lifting foil according to claim 6 wherein said vertical crossection has a ratio of major axis to minor axis ranging between 1.6 and 10.5.

8. A lifting foil according to claim 6 wherein said vertical crossection has a ratio of major axis to minor axis which is approximately 3.0.

9. A lifting foil according to claim 6 wherein said upper course is rearwardly offset from said lower course.

10. A lifting foil according to claim 6 wherein said fuselage is situated midway between said flow guides, said lifting foil being provided with a large starboard passage situated between said fuselage and said starboard flow guide, and a large port passage situated between said fuselage and said port flow guide.

11. A lifting foil according to claim 5 said three surfaces comprising a first surface defining said port passage, a second surface defining said starboard passage and a third surface defining the exterior shape of said lifting foil.

12. A lifting foil according to claim 11, said fuselage being enclosed by cooperative coverage from said first, second and third surfaces.

13. A lifting foil according to claim 1 wherein said lower course comprises
a keel-shaped underside to provide a sideslip-reducing dihedral angle.

14. A lifting foil comprising:
(a) A lower course having a lower starboard margin and a lower port margin, said lower course extending sideward between said lower starboard margin and said lower port margin for generating a first fluid reaction force having an upwardly directed lifting component, (b) An upper course having an upper starboard margin and an upper port margin, said upper course being positioned above said lower course and extending sideward between said upper starboard margin and said upper port margin for generating a second fluid reaction force having an upwardly directed lifting component, (c) A starboard flow guide extending vertically between said lower starboard margin and said upper starboard margin, said starboard flow guide comprising:
  (i) a first upper section secured to said upper starboard margin,
  (ii) a first lower section secured to said lower starboard margin, and
  (iv) a first mid-section positioned between said first upper section and said first lower section, (d) A port flow guide extending vertically between said lower poll margin and said upper port margin, said port flow guide comprising:
  (i) a second upper section secured to said upper port margin,
  (ii) a second lower section severed to said lower port margin, and
  (iv) a second mid-section positioned between said second upper section and said second lower section, said starboard flow guide and said port flow guide having cambered cross-sections characterized by a camber which is substantially zero at an associated flow guide mid-point and which increases progressively to maximum values at opposite ends of associated flow guides.

15. A lifting foil according to claim 14 wherein said upper course is offset upwardly and rearwardly of said lower course.

16. A lifting foil according to claim 15 wherein said upper course is swept forwardly on two sides of a center line extending in an X-direction through said lifting foil, and said lower course is swept rearwardly on two sides of said center line.

17. A lifting foil comprising:
(a) an upper course including an upper starboard end and an upper port end, (b) a lower course including a lower starboard end and a lower port end, said lower course being generally parallel to said upper course with said lower starboard end facing said upper starboard end and said lower port end facing said upper port end, (c) a starboard flow guide having an upper starboard guide section connected to said upper starboard end, a lower starboard guide section connected to said lower starboard end, and a starboard mid-section connecting said upper starboard guide section to said lower starboard guide section, and (d) a port flow guide having an upper port guide section joined to said upper port end, a lower port guide section joined to said lower port end and a port mid-section connecting said upper port guide section to said lower port guide section;

said starboard flow guide having a camber which increases progressively from a minimum camber at a mid-point of said starboard flow guide to a maximum camber at said upper starboard end and also being cambered progressively from said mid-point to said lower starboard end said port flow guide having a camber which increases progressively from a minimum camber at a mid-point of said port flow guide to a maximum camber at said upper port end and also being cambered progressively from said mid-point to said lower port end.

* * * * *